US010692336B2

(12) United States Patent
Fleureau et al.

(10) Patent No.: US 10,692,336 B2
(45) Date of Patent: Jun. 23, 2020

(54) METHOD AND SCHEMES FOR PERCEPTUALLY DRIVEN ENCODING OF HAPTIC EFFECTS

(71) Applicant: INTERDIGITAL VC HOLDINGS, INC., Wilmington, DE (US)

(72) Inventors: Julien Fleureau, Cesson-sevigne (FR); Olivier Dumas, Cesson-sevigne (FR); Bertrand Leroy, Cesson-sevigne (FR); Fabien Danieau, Cesson-sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/736,331

(22) PCT Filed: Jun. 24, 2016

(86) PCT No.: PCT/US2016/064643
§ 371 (c)(1),
(2) Date: Dec. 14, 2017

(87) PCT Pub. No.: WO2017/001293
PCT Pub. Date: Jan. 5, 2017

(65) Prior Publication Data
US 2019/0156639 A1 May 23, 2019

(30) Foreign Application Priority Data

Jun. 29, 2015 (EP) ..................... 15306035

(51) Int. Cl.
*G08B 6/00* (2006.01)
*G06F 3/01* (2006.01)
(Continued)

(52) U.S. Cl.
CPC ............... *G08B 6/00* (2013.01); *G06F 3/016* (2013.01); *H04N 21/23614* (2013.01);
(Continued)

(58) Field of Classification Search
CPC .......... G08B 6/00; G06F 3/016; G06F 3/011; H04N 21/2361; H04N 21/4131; H04N 21/8126; G01C 21/20
See application file for complete search history.

(56) References Cited

U.S. PATENT DOCUMENTS 8,952,888 B2 * 2/2015 Van Den Eerenbeemd ................
G06F 3/016
345/156
9,821,236 B2 * 11/2017 Danieau ................... G09B 9/02
(Continued)

FOREIGN PATENT DOCUMENTS

KR 20120064789 6/2012
WO WO2009136345 11/2009

OTHER PUBLICATIONS

Hasegawa et al., Human-Scale Haptic Interaction With a Reactive Virtual Human in a Real-Time Physics Simulator, ACM Computers in Entertainment, vol. 4, No. 3, Jul. 2006, Article 6C.
(Continued)

*Primary Examiner* — Hoi C Lau
(74) *Attorney, Agent, or Firm* — Patricia A. Verlangieri

(57) ABSTRACT

An encoder and encoding method map haptic effects for various haptic channels to a plurality of areas of a body model. The haptic channels represent temperature, vibration, or similar such effects for use by haptic actuators, for example. Each channel comprises signals to represent a timestamp, face locations and identifiers, and spatial and temporal resolution values to control effect resolutions for various parts of the body for a particular effect controlled by that channel. The haptic channels are multiplexed together to form a composite signal that can control various effects to a plurality of body locations.

11 Claims, 13 Drawing Sheets

(51) Int. Cl.
*H04N 21/236* (2011.01)
*H04N 21/41* (2011.01)
*H04N 21/81* (2011.01)

(52) U.S. Cl.
CPC ..... *H04N 21/4131* (2013.01); *H04N 21/8126* (2013.01); *G06F 3/011* (2013.01)

(56) References Cited

U.S. PATENT DOCUMENTS

| | | | |
|---|---|---|---|
| 9,997,032 B2* | 6/2018 | Lacroix | G08B 6/00 |
| 10,386,926 B2* | 8/2019 | Rain | G06T 19/006 |
| 2004/0078885 A1* | 4/2004 | Walker | A61H 39/04 |
| | | | 4/541.1 |
| 2004/0254771 A1* | 12/2004 | Riener | G09B 23/32 |
| | | | 703/7 |
| 2007/0236450 A1* | 10/2007 | Colgate | G06F 3/016 |
| | | | 345/156 |
| 2008/0094351 A1* | 4/2008 | Nogami | G06F 3/016 |
| | | | 345/156 |
| 2008/0120029 A1* | 5/2008 | Zelek | G01C 21/20 |
| | | | 701/469 |
| 2008/0246737 A1* | 10/2008 | Benali-Khoudja | G09B 21/003 |
| | | | 345/173 |
| 2009/0096632 A1* | 4/2009 | Ullrich | H04N 21/8547 |
| | | | 340/4.21 |
| 2010/0134327 A1* | 6/2010 | Dinh | G06F 3/014 |
| | | | 341/20 |
| 2010/0217413 A1* | 8/2010 | Seiler | H04R 3/12 |
| | | | 700/94 |
| 2010/0225773 A1* | 9/2010 | Lee | H04N 5/232 |
| | | | 348/222.1 |
| 2010/0302015 A1* | 12/2010 | Kipman | G06F 3/011 |
| | | | 340/407.1 |
| 2013/0038792 A1 | 2/2013 | Quigley et al. | |
| 2013/0227410 A1* | 8/2013 | Sridhara | H04N 21/235 |
| | | | 715/702 |
| 2013/0335209 A1* | 12/2013 | Cruz-Hernandez | G08B 6/00 |
| | | | 340/407.1 |
| 2014/0266646 A1* | 9/2014 | Urbach | G08B 6/00 |
| | | | 340/407.1 |
| 2014/0270681 A1* | 9/2014 | Sen | G11B 31/00 |
| | | | 386/201 |
| 2014/0300454 A1* | 10/2014 | Lacroix | G08B 6/00 |
| | | | 340/407.2 |
| 2014/0317498 A1* | 10/2014 | Okumura | G06F 3/016 |
| | | | 715/702 |
| 2015/0070152 A1* | 3/2015 | Rank | G06F 3/016 |
| | | | 340/407.1 |
| 2015/0077324 A1* | 3/2015 | Birnbaum | G06F 3/016 |
| | | | 345/156 |
| 2015/0145656 A1* | 5/2015 | Levesque | G06F 1/163 |
| | | | 340/407.1 |
| 2015/0154966 A1* | 6/2015 | Bharitkar | G10L 19/008 |
| | | | 381/23 |
| 2015/0317910 A1* | 11/2015 | Daniels | G16H 20/30 |
| | | | 84/485 R |
| 2015/0355713 A1* | 12/2015 | Lacroix | G06F 3/016 |
| | | | 340/407.1 |
| 2015/0363365 A1* | 12/2015 | Campbell | G06F 3/0412 |
| | | | 345/173 |
| 2016/0019762 A1* | 1/2016 | Levesque | G06F 3/03547 |
| | | | 340/407.1 |
| 2016/0027338 A1* | 1/2016 | Ebeling | G09B 21/009 |
| | | | 340/4.12 |
| 2016/0110551 A1* | 4/2016 | Fugate | G06F 3/015 |
| | | | 726/25 |
| 2016/0179332 A1* | 6/2016 | Cho | G06F 3/04883 |
| | | | 715/863 |
| 2016/0189493 A1* | 6/2016 | Rihn | G08B 6/00 |
| | | | 340/407.1 |
| 2016/0253552 A1* | 9/2016 | Rihn | G06F 3/016 |
| | | | 382/224 |
| 2016/0331264 A1* | 11/2016 | Helms-Tillery | A61B 5/6868 |
| 2016/0375346 A1* | 12/2016 | Czaja | A63C 11/003 |
| | | | 434/253 |
| 2017/0090570 A1* | 3/2017 | Rain | G06F 3/016 |
| 2017/0092084 A1* | 3/2017 | Rihn | G06F 3/167 |
| 2017/0364143 A1* | 12/2017 | Danieau | G06F 3/016 |
| 2018/0200619 A1* | 7/2018 | Guillotel | G06F 3/011 |
| 2018/0218641 A1* | 8/2018 | Cruz | G09B 21/003 |
| 2018/0303702 A1* | 10/2018 | Novich | A61H 3/061 |
| 2019/0156639 A1* | 5/2019 | Fleureau | G06F 3/016 |

OTHER PUBLICATIONS

Ding et al., The Developement of a Real-Time Wearable Motion Replication Platform With Spatial Sensing and Tactile Feedback, The 2010 IEEE/RSJ International Conference on Intelligent Robots and Systems Oct. 18-22, 2010, Taipei, Taiwan.

Kim et al., Construction of a haptic-enabled broadcasting system based on the MPEG-V standard, Signal Processing, Image Communication., vol. 28, No. 2, Feb. 1, 2013, pp. 151-161.

Lederman et al., Haptic perception: A tutorial, Attention, Perception, & Psychophysics, vol. 1. 71, No. 7, Sep. 28, 2009 pp. 1439-1459.

Danieau et al., Enhancing Audiovisual Experience with Haptic Feedback: A Survey on HAV, IEEE Transactions on Haptics, vol. 6, No. 2, Apr. 1, 2013, pp. 193-205.

\* cited by examiner

```
<sed1:DescriptionMetadata>
 <sed1:ClassificationSchemeAlias   alias="TACTILEEFFECT"
href="urn:mpeg:mpeg-v: 01-SI-TactileEffectCS-NS"/>
</ sed1:DescriptionMetadata>
<sed1:Effect    xsi: type="sev:TactileType"    updateRate="2"
tactileEffect=":TACTILEEFFECT:vibration"          si:pts="5"
location=":LCS:centerleft :middle:front">
    <sev:ArrayIntensity mpeg7 : dim="3  3">250 250 250 0 0 0 150
120 150 </sev:ArrayIntensity>
</sed1:Effect>
```

*FIG. 2*

```
#model id
 id vibration_model

# List of Vertices, wi t h (x,y, z) coordinates
v 0.123 0.234 0.345
v ...

# Face Definitions
f 1 2 3
f ...

# Haptic Perception
h 1000 / 0 / 5  #frequency,  min amplitude ,  max amplitude
h ...
------
#model id
id temperature model
v  0.250  0.365  0.489
v ...

METHOD AND SCHEMES FOR PERCEPTUALLY DRIVEN ENCODING OF HAPTIC EFFECTS

TECHNICAL FIELD

The present principles relate generally to the field of haptics and multimedia.

BACKGROUND

New technological developments allow the creation of more and more immersive multimedia systems. Three dimensional (3D) images and spatialized sound are now present in the end-user living space. But these systems are still limited to the stimulation of two senses, sight and hearing, while research in virtual reality has shown that haptic perception seems to be strongly connected to an immersive feeling.

From this research effort, a new scientific field called haptic-audiovisual (HAV) has emerged. HAV, introduced by A. E. Saddik in 2011, relates to the combination of haptics and audiovisual content. Since this is a recent area, all mechanisms, tools and concepts have yet to be specified (see FIG. 1).

The MPEG-V (Moving Picture Experts Group—Media Context and Control) architecture is one formalization of this workflow for producing, distributing, and rendering HAV content. The MPEG-V standard describes "Sensory Effects" which includes haptic effects but also gustatory and olfactory effects.

MPEG-V supports several haptic effects such as vibrations, rigid body motion or force-feedback. The effects can also stimulate the user's entire body or target a specific point in a space shared by the user (see example in FIG. 2).

MPEG-V targets the stimulation of the entire user's body and also targets the stimulation of a specific point in the space in which the user moves. In a same way, the haptic devices, also called actuators, can be defined by setting their capabilities, in term of ability to render haptic effects, and their location regarding the user's space. According to MPEG-V, only a point in the user's space is defined to render the haptic effects which may be an issue when the user moves in the space. In such a case, the haptic effect will not be felt by the user.

However, this description of the location of the effects does not allow a user to directly address a part of the user's body. Only a point in a space defined by a cube is given, for example, centerleft:middle:front in FIG. 2.

This representation does not take into account the human haptics perception. For example, it is known that if two vibrating stimuli are too close on the skin, only one vibration will be felt. From such a description of haptic effects, useless information may be stored or transmitted to a haptic renderer.

Moreover, a single update rate is specified. However, several locations on the user's body which are stimulated can have different temporal sensitivities.

The MPEG-V standard proposes a high-level description of haptic effects. However, the standard does not take into account human perceptual specificities and thus can encapsulate redundant data with a too low or a global spatial and temporal granularity.

In EP Application 14305823.8, the use of a detailed 3D body model, a skeleton, for example, was introduced to relate the haptic effects and the actuator inputs. Here the body model was used to infer the actuator inputs from an effect which could happen from a point not located at the actuator place through the use of physical model.

SUMMARY

The described embodiments propose a deeper use of 3D body models to provide methods and apparatus for compact and perceptually-driven encoding and potentially transmitting haptic effects.

According to one general aspect, a method is provided. The method comprises mapping haptic effects to a body model comprising a set of vertices and faces with a variable spatial resolution for a particular haptic channel. The method further comprises embedding metadata onto the faces corresponding to properties related to the particular haptic channel corresponding to the haptic effects and location. The method further comprises concatenating information related to the particular haptic channel, comprising a timestamp and face identifier, and multiplexing signals for a plurality of haptic channels into a haptic signal.

According to another general aspect, an apparatus is provided. The apparatus comprises a first processor that maps haptic effects to a body model comprising a set of vertices and faces with a variable spatial resolution for a particular haptic channel. The apparatus further comprises a second processor to embed metadata onto the faces corresponding to properties related to the particular haptic channel corresponding to the haptic effects and location, and a third processor to concatenate information related to a particular haptic channel, comprising a timestamp and face identifier. The apparatus further comprises a multiplexer operating on signals for a plurality of haptic channels to form a haptic signal.

The details of one or more implementations are set forth in the accompanying drawings and the description below. Even if described in one particular manner, it should be clear that implementations can be configured or embodied in various manners. For example, an implementation can be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

BRIEF DESCRIPTION OF THE DRAWINGS

The present principles can be better understood in accordance with the following exemplary figures, in which:

FIG. 2 shows one embodiment of a vibration effect near the heart, rendered by a 3×3 matrix of actuators, under the present principles.

FIG. 7 shows one embodiment of code for storage of a set of haptic body models of reference, under the present principles.

DETAILED DESCRIPTION

Figure 1:
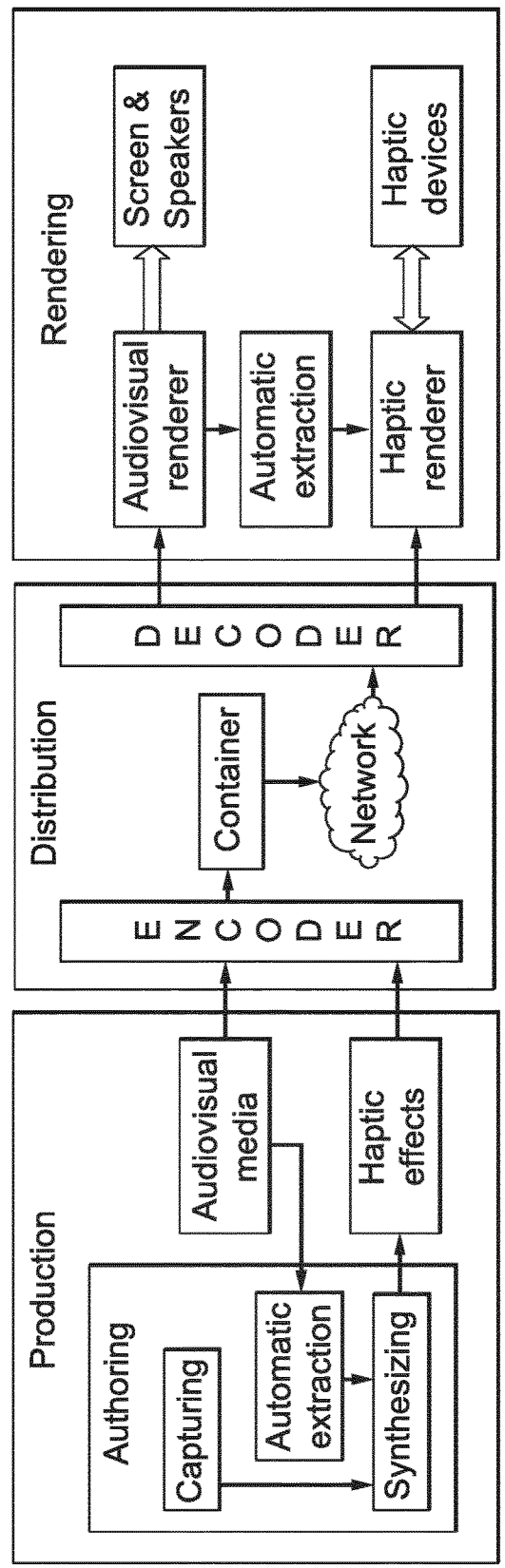
FIG. 1 shows one embodiment of a workflow for haptic audio-visual, under the present principles.
Figure 3:
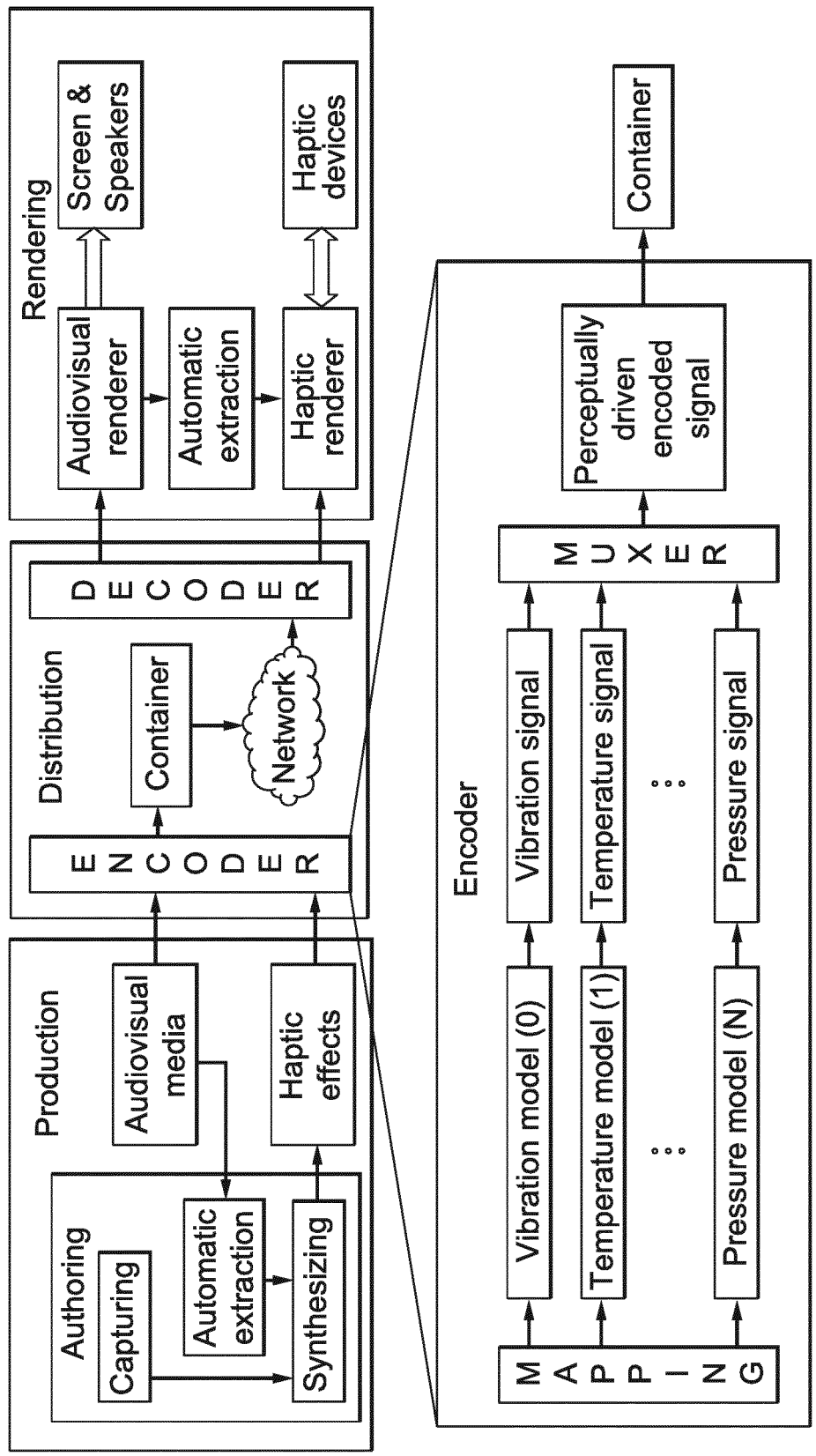
FIG. 3 shows one embodiment of a perceptually-driven encoding scheme for haptic signals, under the present principles.

The principles of the described embodiments aim to produce a perceptually-driven encoded haptic signal from high-level descriptions of haptic effects provided during an authoring stage, such as that shown in FIG. 3.

One key aspect is to re-map those high-level effects on several underlying 3D body models which take into account the perceptual properties of a mean human being for the different haptic channels (vibration, temperature, pressure, etc).

One body model may be defined for each haptic channel. For example, a body model can be created for vibration, another for temperature, and so on. Each body model is characterized by a set of vertices and faces with a variable spatial resolution, or face size, depending on the user spatial sensitivity on the considered channel. Each face also embeds some meta-information corresponding to some key properties related to the specific targeted haptic channel and location, such as the required temporal resolution or the minimum and maximum admissible values.

Once the re-mapping has been done (with a potential interpolation between different key frames given during an authoring stage), a signal is generated for each model/component as a concatenation of a face identifier relative to the associated 3D model, a timestamp computed regarding the associated temporal resolution, and a normalized actual value (min/max mapped to 0/1). Only the active faces, where a change occurred, can be considered.

The different signals for each haptic channel are then multiplexed into a perceptually-driven encoded haptic signal through a simple concatenation where each model/component is identified by a dedicated identifier. As a final step, the signal can be compressed to be transmitted or stored, but this compression step is not addressed here.

This perceptually-driven encoded haptic signal natively takes into account spatial and temporal human perception properties thanks to its model-based construction and can be highly compact and adaptive for transmission. Indeed, in a streaming context, the different body models can be part of a dedicated standard, which do not necessarily need to be transmitted, and only the model and face identifiers as well as the timestamps and values are transmitted.

Consider a detailed implementation of the encoding strategy just described. The input high-level haptic are given through the use of an authoring tool (FIG. 4) which could combine automatic capture of haptic data and manual editing. In this example, high-level haptic effects such as "high temperature on the left forearm" and "vibrations on the left arm" are required.

The first step of the encoding procedure is the mapping of the high-level effects on the underlying body models defined as models of reference for each haptic channel.

Figure 6:
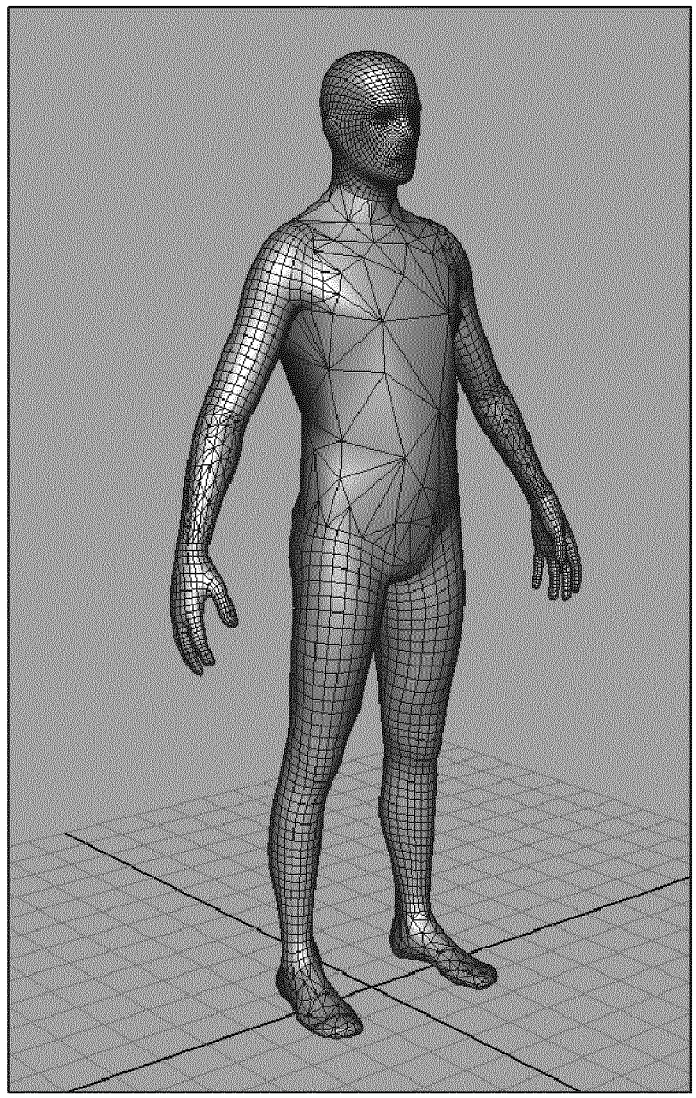
FIG. 6 shows an example of a haptic channel-adaptive mesh.

As mentioned before, each model is characterized by a set of faces/parts with spatial resolution depending on the user spatial sensitivity on the considered channel (FIG. 6).

Figure 5:
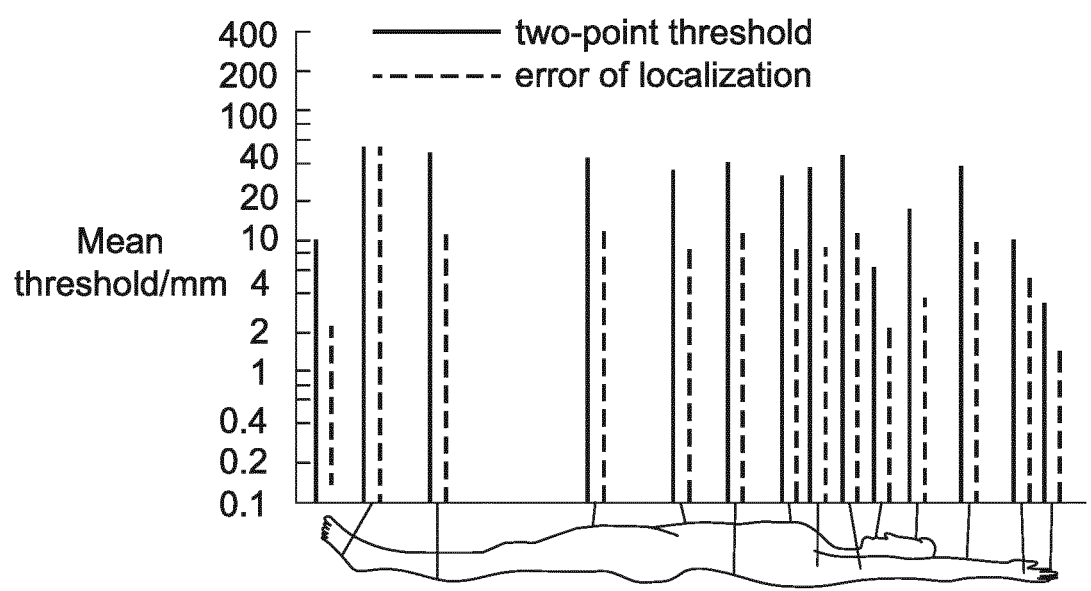
FIG. 5 shows a sensitivity graph of the human body.

It is well known that most of the human tactile sensors are located on the hands, whereas our sensitivity is much less developed on the arm or torso, for example (FIG. 5). For the tactile channel, it is thus logical to build a body model with a higher resolution on the palms/fingers areas than on the arm. This solution could be different for another haptic channel such as a kinesthetic sense channel, for example.

Each face/part of the model also embeds some meta-information corresponding to key properties related to the specific targeted haptic channel and location. A first piece of information can be the local temporal resolution compatible with the considered haptic channel. It is clear that encoding a temperature signal at a 100 Hz frequency is not appropriate, whereas it is more appropriate for the case of a motion signal. A second piece of information can be the minimum/maximum value admissible for the considered haptic channel. This information can be useful for the re-normalization step of the mapping described in the next section.

A convenient way to store those body models in one embodiment can be a variant of the "wavefront" format (.obj) which classically stores 3D CGI models as a set of vertices and faces. As an example, in this embodiment, for each model, in addition to the classical vertices and faces information, a field containing the metadata representing frequency and minimum/maximum permissible values for each face can be concatenated to the classical representation, as shown in FIG. 7.

The mapping procedure of a high-level haptic effect (possibly interpolated) at a given timestamp consists in:

1. Selection: Select the model(s) of reference involved in the current haptic effect.

2. Projection: Project each input high-level haptic effect on the closest faces/parts of the body model(s) corresponding to the associated haptic channel.

3. Spatial filtering: Collect all the active faces according to the underlying spatial resolution of the considered body model(s).

4. Temporal filtering: Resample to fit the corresponding temporal frequency provided by the model(s) metadata.

5. Normalization: Scale and possibly threshold the high-level value to [0;1] so that the final value fits the minimum/maximum provided by the model(s) metadata.

After the mapping process, for each body model, a first mono-channel perceptually-driven encoded haptic signal is built where each sample of this signal is composed of:

The current timestamp

The set of activated faces

The normalized activation values

Figure 4:
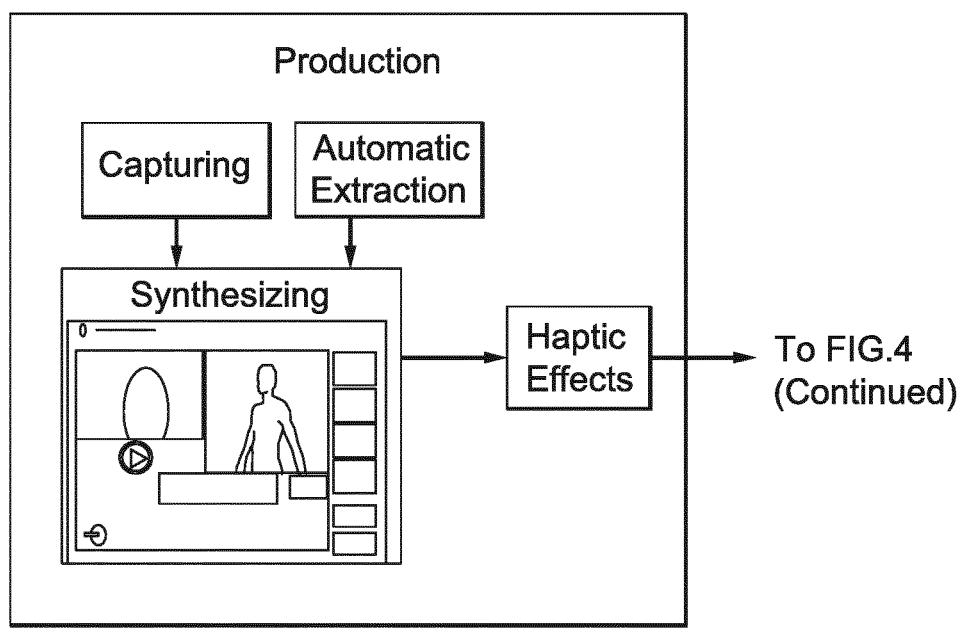
FIG. 4 shows one embodiment of an encoding workflow, under the present principles.
Figure 4:
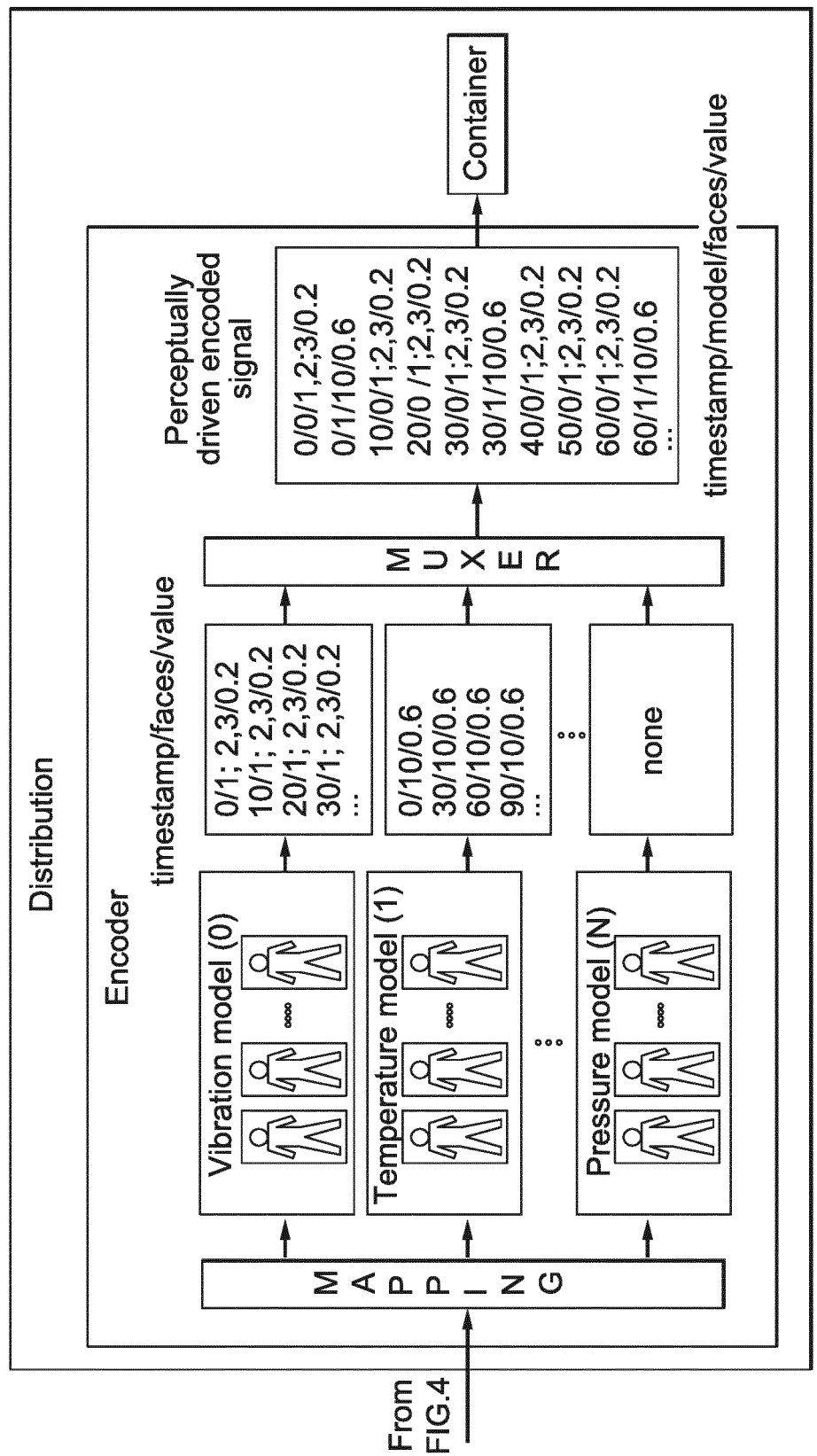

Such a signal is built for each affected body model. An example is shown in FIG. 4.

The final perceptually-driven encoded haptic signal is obtained through a multiplexing step which temporally re-orders each mono-channel encoded signal and adds a body model identifier to specify which body model is currently considered. An example is shown in FIG. 4.

Figure 8:
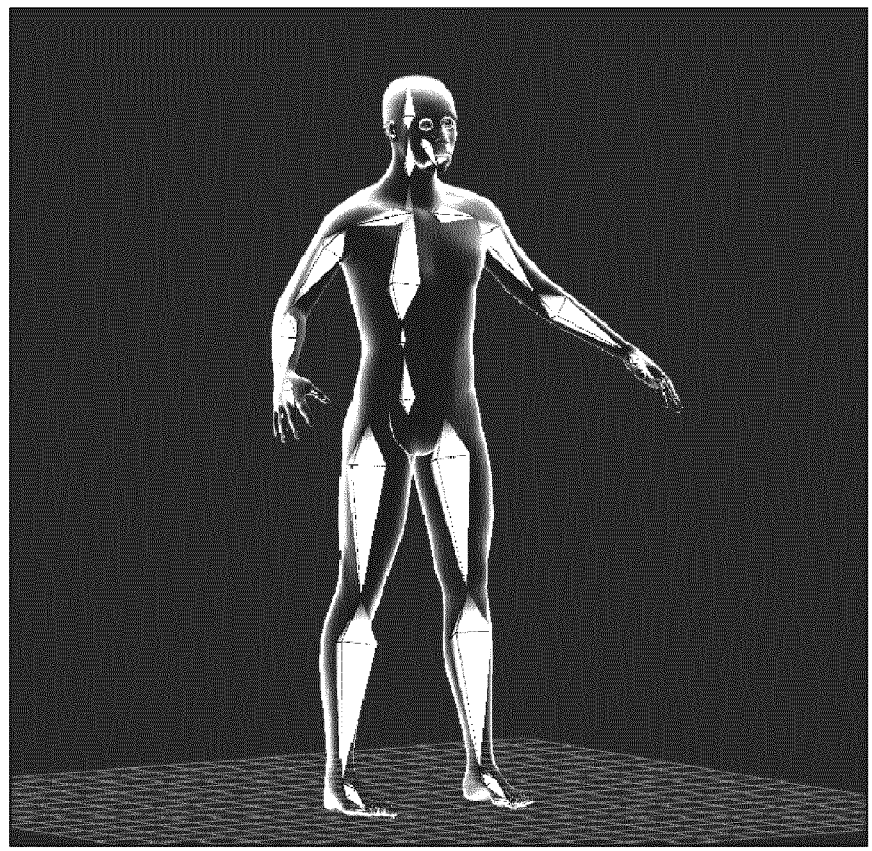
FIG. 8 shows one embodiment of a body model represented by a skeleton.

Instead of a body model represented by vertices and faces, a skeleton with bones and joints can be used, as shown in the example of FIG. 8. This representation would be more adapted for kinesthetic effects (movements of the limbs or force feedback).

The body model can also be represented hierarchically, as shown in the example of FIG. 8 in another embodiment.

Thus, a body part, for example an arm, can be sent instead of all face identifiers used to describe it. In this embodiment, there is less transmitted data.

Another advantage of this embodiment is a more "human-comprehensive" representation of the body. The perceptually-driven encoded signal described in FIG. 4 can then be written as:
0/0/50/0.2
0/1/60/0.6
10/0/50/0.2
20/0/50/0.2
30/0/50/0.2
30/1/60/0.6
40/0/50/0.2
50/0/50/0.2
60/0/50/0.2
60/1/60/0.6
where the code 50 represents all of the faces related to the arm and the code 60 represents all of the faces related to the forearm.

Figure 9:
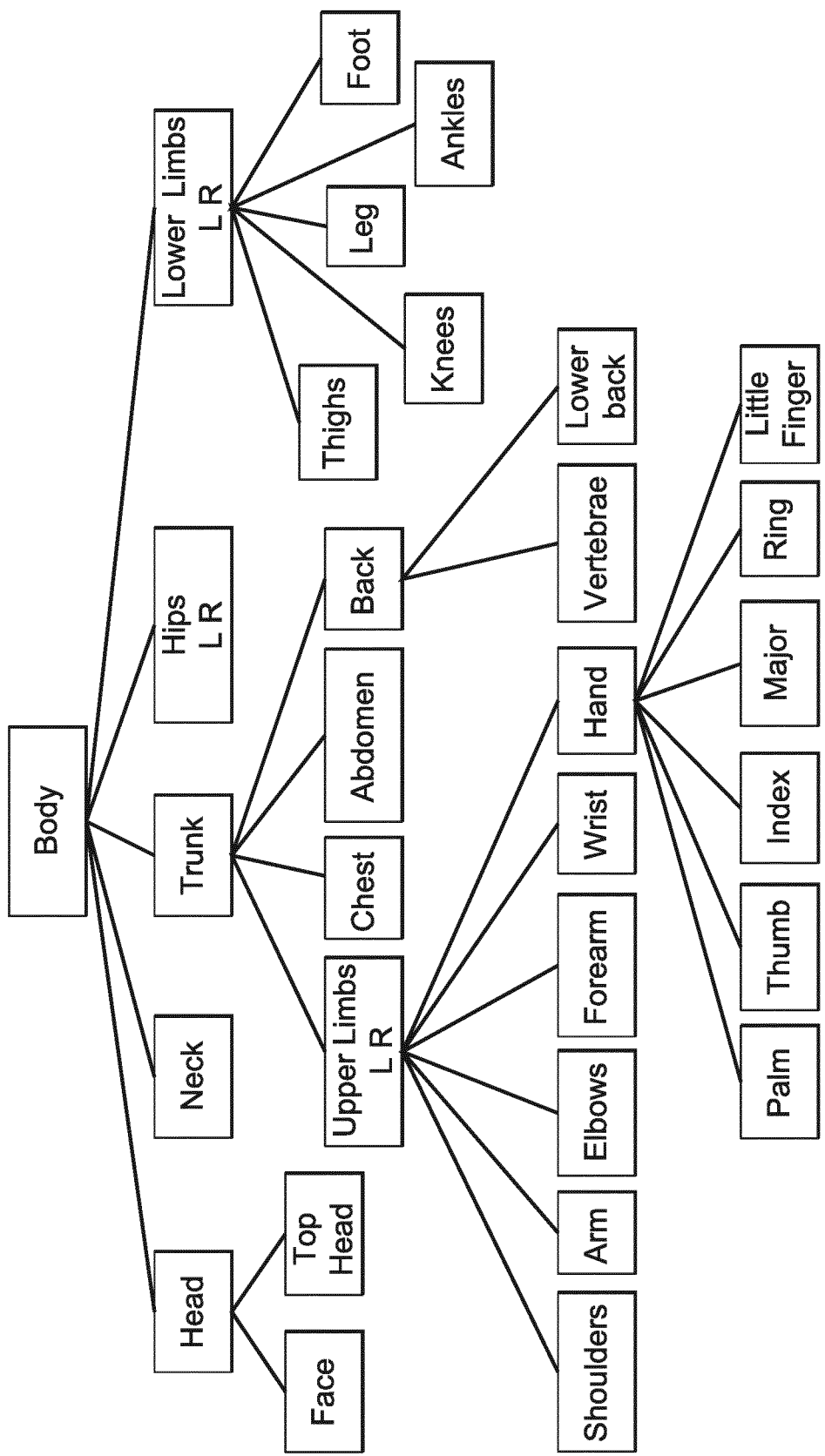
FIG. 9 shows one embodiment of a hierarchical body model, under the present principles.
Figure 10:
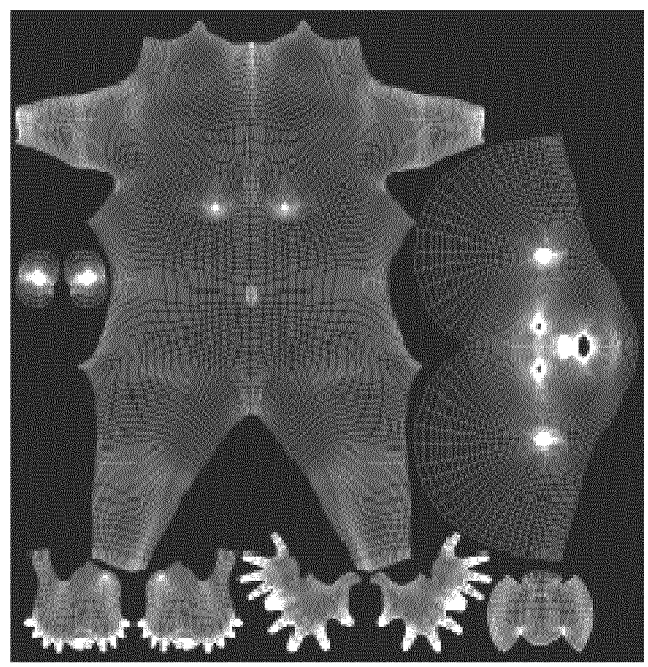
FIG. 10 shows an example of a UV map classically used to map a texture on a 3D model.

Optimized haptic effects can be described with a UV map in another embodiment, as shown for example in FIG. 9. Such images can easily be mapped onto a 3D model.

Figure 11:
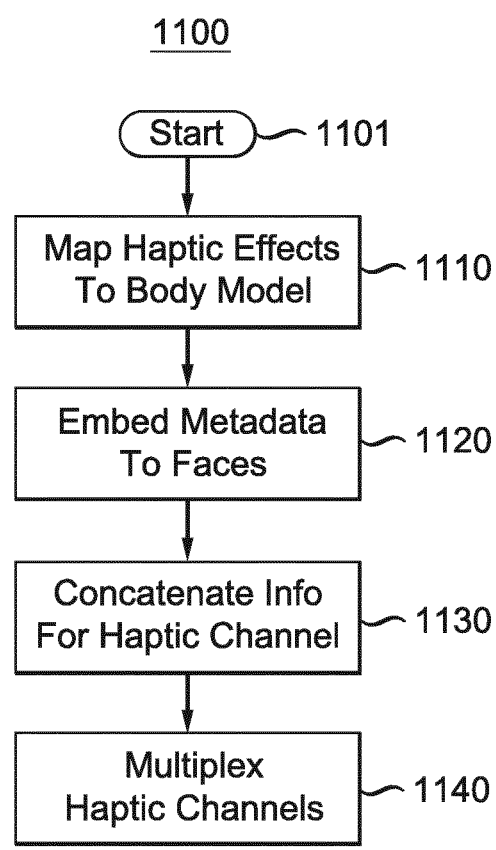
FIG. 11 shows one embodiment of a method for forming a multi-channel haptic effects signal, under the present principles.

FIG. 11 shows one embodiment of a method 1100 for forming a multi-channel haptic effects signal. The method comprises a Start block 1101 from which control proceeds to block 1110 for mapping haptic effects to a body model. The body model can comprise a set of vertices and faces with variable spatial resolution for that particular haptic channel. Control proceeds from block 1110 to block 1120 for embedding metadata onto the faces of the haptic channel. The metadata comprises information related to the particular haptic channel. Control proceeds from block 1120 to block 1130 for concatenating information related to the haptic channel. This information comprises a timestamp and face identifier. Control next proceeds from block 1130 to block 1140 for multiplexing signals for a plurality of haptic channels into a multi-channel haptic signal.

Figure 12:
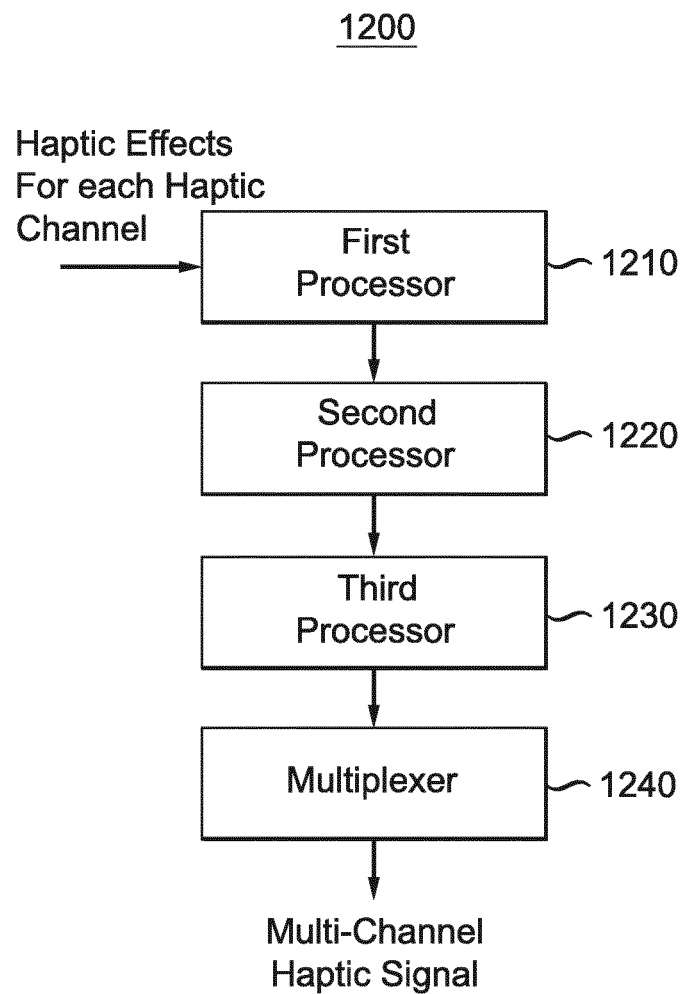
FIG. 12 shows one embodiment of an apparatus for forming a multi-channel haptic effects signal, under the present principles.

FIG. 12 shows one embodiment of an apparatus 1200 for forming a multi-channel haptic effects signal. The apparatus comprises a First Processor 1210 for mapping haptic effects to a body model. The body model can comprise a set of vertices and faces with variable spatial resolution for that particular haptic channel. A first input of First Processor 1210 receives haptic effects. The haptic effects for each haptic channel can be received serially, or the first input can actually be implemented with parallel inputs that receive haptic effect information from sources in parallel. The output of First Processor 1210 is in signal connectivity with the input to Second Processor 1220. Second Processor 1220 embeds metadata onto the faces of the haptic channel. The metadata comprises information related to the particular haptic channel. The output of Second Processor 1220 is in signal connectivity with the input to Third Processor 1230. Third Processor 1230 concatenates information related to the haptic channel. This information comprises a timestamp and face identifier. The output of Third Processor 1230 is in signal connectivity with the input to Multiplexer 1240, which multiplexes signals for a plurality of haptic channels into a multi-channel haptic signal.

The processors in any of the described embodiments can be implemented using distinct processors, integrated processors, or some combination of integrated and distinct processors. One or all of the processors can be implemented as part of other circuitry as well.

The present description illustrates the present principles. It will thus be appreciated that those skilled in the art will be able to devise various arrangements that, although not explicitly described or shown herein, embody the present principles and are thereby included within the present principles.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles are not limited to those precise embodiments, and that various changes and modifications can be effected therein by one of ordinary skill in the pertinent art without departing from the scope of the present principles. All such changes and modifications are intended to be included within the scope of the present principles as set forth in the appended claims.

What is claimed is:

1. A method, comprising:
mapping haptic effects to a body model comprising a set of vertices and faces with a variable resolution for a particular haptic channel;
determining metadata corresponding to properties related to said particular haptic channel corresponding to said haptic effects and location;
collecting information related to said particular haptic channel comprising a timestamp and face identifier; and
multiplexing said collected information for a plurality of haptic channels into a haptic signal.

2. The method of claim 1, wherein said concatenated information further comprises normalized activation values.

3. The method of claim 1, further comprising compressing said haptic signal.

4. The method of claim 1, further comprising transmitting said haptic signal.

5. A method, comprising:
mapping haptic effects to a body model comprising a set of vertices and faces with a variable resolution for a particular haptic channel;
determining metadata corresponding to properties related to said particular haptic channel corresponding to said haptic effects and location;
collecting information related to said particular haptic channel comprising a timestamp and face identifier; and
multiplexing said collected information for a plurality of haptic channels into a haptic signal wherein mapping comprises:
selecting a body model of reference for a haptic effect;
projecting haptic effects on faces of said body model associated with a haptic channel;
collecting active faces according to a spatial resolution of said body model;
resampling information related to said haptic effects to fit a temporal frequency provided in said metadata; and
scaling said information related to said haptic effects to fit a range provided by said metadata.

6. An apparatus, comprising:
a first processor that maps haptic effects to a body model comprising a set of vertices and faces with a variable resolution for a particular haptic channel;
a second processor to determine metadata corresponding to properties related to said particular haptic channel corresponding to said haptic effects and location;
a third processor to collect information related to said particular haptic channel comprising a timestamp and face identifier; and
a multiplexer operating on signals for a plurality of haptic channels to form a haptic signal.

7. The apparatus of claim 6, wherein said concatenated information further comprises normalized activation values.

8. The apparatus of claim 6, further comprising a data compressor operating on said haptic signal.

9. The apparatus of claim 6, further comprising a transmitter operating on said haptic signal.

10. An apparatus, comprising:
a first processor that maps haptic effects to a body model comprising a set of vertices and faces with a variable resolution for a particular haptic channel;
a second processor to determine metadata corresponding to properties related to said particular haptic channel corresponding to said haptic effects and location;
a third processor to collect information related to said particular haptic channel comprising a timestamp and face identifier; and a multiplexer operating on signals for a plurality of haptic channels to form a haptic signal wherein said first processor:

selects a body model of reference for a haptic effect;

projects haptic effects on faces of said body model associated with a haptic channel;

collects active faces according to a spatial resolution of said body model;

resamples information related to said haptic effects to fit a temporal frequency provided in said metadata; and scales said information related to said haptic effects to fit a range provided by said metadata.

11. A non-transitory computer readable storage media having video signal data encoded thereupon, comprising:

haptic effects mapped to a body model comprising a set of vertices and faces with a variable resolution for a particular haptic channel;

metadata corresponding to properties related to said particular haptic channel corresponding to said haptic effects and location;

collected information related to said particular haptic channel comprising a timestamp and face identifier; and multiplexed said collected information for a plurality of haptic channels to form a haptic signal.

* * * * *